United States Patent
Lee

(10) Patent No.: US 8,654,209 B2
(45) Date of Patent: Feb. 18, 2014

(54) PHOTOGRAPHY CONTROL METHOD AND APPARATUS FOR PROHIBITING USE OF FLASH

(75) Inventor: Yun-mi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 12/499,170

(22) Filed: Jul. 8, 2009

(65) Prior Publication Data

US 2010/0007746 A1 Jan. 14, 2010

(30) Foreign Application Priority Data

Jul. 9, 2008 (KR) .................... 10-2008-0066732

(51) Int. Cl.
*H04N 5/243* (2006.01)
(52) U.S. Cl.
USPC ................................. 348/230.1; 348/216.1
(58) Field of Classification Search
USPC ............ 348/208.6, 216.1, 229.1, 230.1, 255, 348/239
See application file for complete search history.

(56) References Cited

U.S. PATENT DOCUMENTS

| | | | |
|---|---|---|---|
| 2006/0158532 A1* | 7/2006 | Ayaki et al. | 348/229.1 |
| 2007/0009245 A1* | 1/2007 | Ito | 396/55 |
| 2008/0204565 A1* | 8/2008 | Yumiki | 348/208.99 |
| 2008/0240607 A1* | 10/2008 | Sun et al. | 382/275 |
| 2009/0273667 A1* | 11/2009 | Nozaki et al. | 348/77 |
| 2010/0007726 A1* | 1/2010 | Barbieri et al. | 348/78 |

FOREIGN PATENT DOCUMENTS

| | | | |
|---|---|---|---|
| JP | 2005086488 A * | 3/2005 | |
| JP | 2005-215684 A | 7/2005 | |
| JP | 2006-041673 A | 2/2006 | |
| JP | 2007-208922 A | 8/2007 | |
| WO | WO 2007129438 A1 * | 11/2007 | |

\* cited by examiner

*Primary Examiner* — Jason Whipkey
(74) *Attorney, Agent, or Firm* — Drinker Biddle & Reath LLP

(57) ABSTRACT

A photography control method, apparatus, and computer readable medium for prohibiting the use of a flash. The method includes recognizing a sensitive face from an obtained image and prohibiting the use of the flash when the recognized face is a sensitive face. The method may include determining whether or not the image is taken from a dark environment and if the image is taken from a dark environment, then increasing the optical sensitivity and optionally performing advanced shake reduction.

7 Claims, 4 Drawing Sheets

PHOTOGRAPHY CONTROL METHOD AND APPARATUS FOR PROHIBITING USE OF FLASH

CROSS-REFERENCE TO RELATED PATENT APPLICATIONS

This application claims the benefit of Korean Patent Application No. 10-2008-0066732, filed on Jul. 9, 2008 in the Korean Intellectual Property Office, the entire contents of which is incorporated herein by reference.

BACKGROUND OF THE INVENTION

1. Field of the Invention

The present invention relates to a photography control technology, and more particularly, to a photography control method and apparatus for prohibiting the use of a flash, and a digital photography device using the photography control method and apparatus.

2. Description of the Related Art

In a general camera system, a camera flash automatically emits a light beam when an image is photographed in a dark environment. Even in a bright environment, the camera flash may emit a light beam by intentionally setting a flash-on mode. The light beam of the camera flash is useful when the quantity of a light beam is insufficient or a photographer intends to produce a special effect on a photo. However, the light beam of the camera flash is so strong as to leave an afterimage on human eyes. In particular, when a portrait of a person is photographed, the light beam gives a shock to the eyes of the person so that the person may go blind for a while after the emission of the light beam.

This phenomenon is very serious or even dangerous when the person is a baby or a toddler who is so young that the function of eyes does not work properly. This happens frequently and unconsciously when the camera is set to a flash auto mode, a baby is photographed in a dark place, or the flash-on mode is intentionally set.

SUMMARY OF THE INVENTION

To solve the above and/or other problems, the present invention provides a photography control method and apparatus capable of recognizing a sensitive face and automatically prohibiting the use of a flash to protect the eyesight of the sensitive face.

A photography control method for prohibiting the use of a flash is disclosed. The method including determining whether an image contains a sensitive face; and when the image contains a sensitive face, prohibiting the use of the flash. The photography control method may further include performing advanced shake reduction when the use of the flash is prohibited. The photography control method may further include increasing an optical sensitivity for photographing an image when the use of the flash is prohibited. The photography control method may further include performing advanced shake reduction when the optical sensitivity is increased. The photography control method may further include recognizing a face from an obtained image and determining the recognized face is a sensitive face if the recognized face is determined to be a face of a baby.

A computer program product is disclosed. The computer program product includes a computer-readable medium including a first set of codes for causing a computer to determine whether an image contains a sensitive face; and a second set of codes for causing a computer to prohibit the use of the flash when the image contains a sensitive face.

A photography control apparatus for prohibiting the use of a flash is disclosed. The photography control apparatus including a face recognition unit configured to recognize a sensitive face from an obtained image; and a control unit configured to prohibit the use of the flash when the recognized face is a sensitive face. The control unit may be further configured to perform advanced shake reduction when the use of the flash is prohibited. The control unit may be further configured to increase an optical sensitivity for photographing an image, when the use of the flash is prohibited. The control unit may be further configured to perform advanced shake reduction, when the optical sensitivity is increased.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
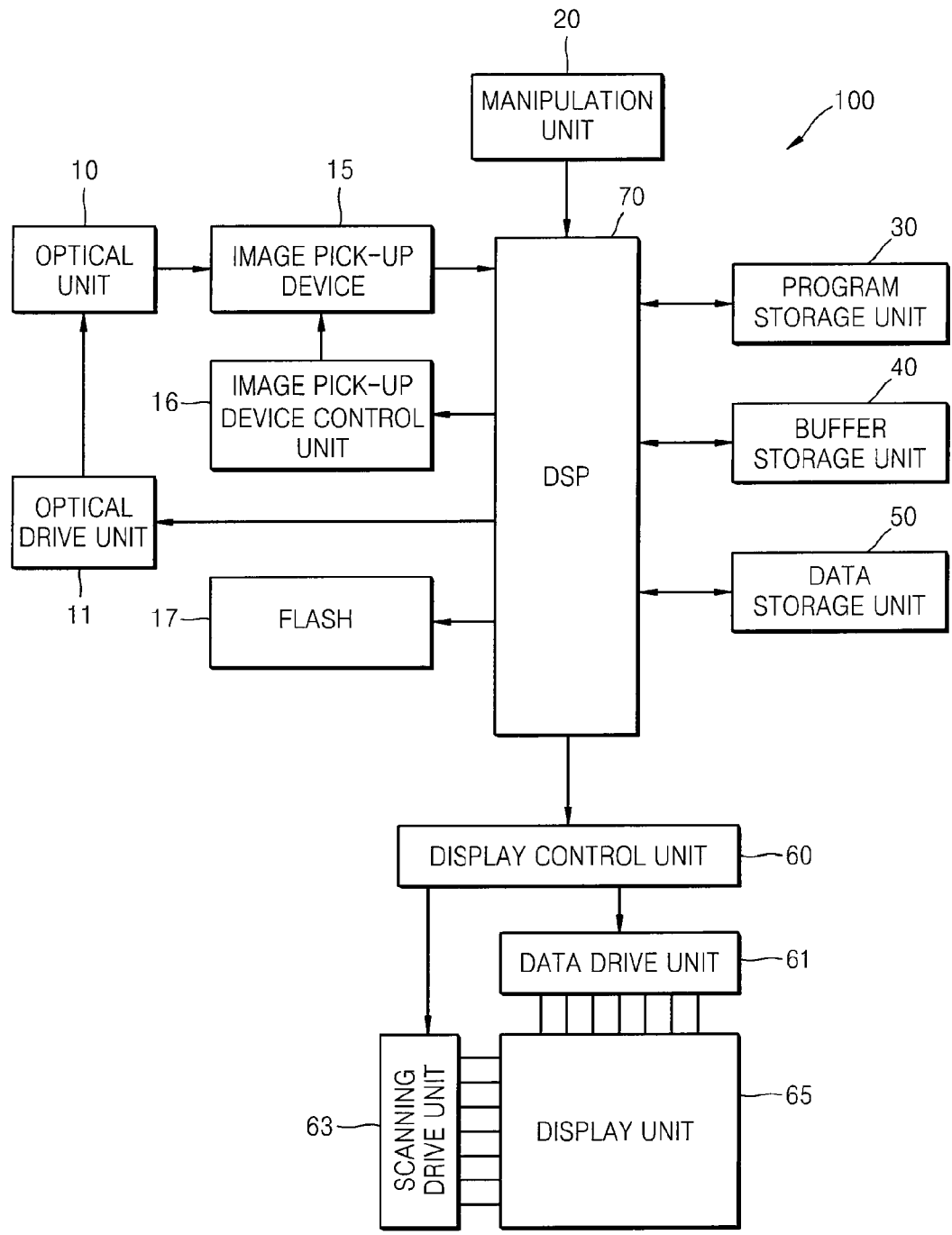
FIG. 1 is a block view of an example of a digital image pickup device according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

A sensitive face is the face of a person such as a baby for whom the digital image pickup device has determined that the flash should not be used because their eyesight needs to be protected from a light beam of the flash. A person to be protected may include, but is not limited to, babies, children, and aged persons, whose eyesight also may need to be protected from a light beam of a camera flash.

Figure 2:
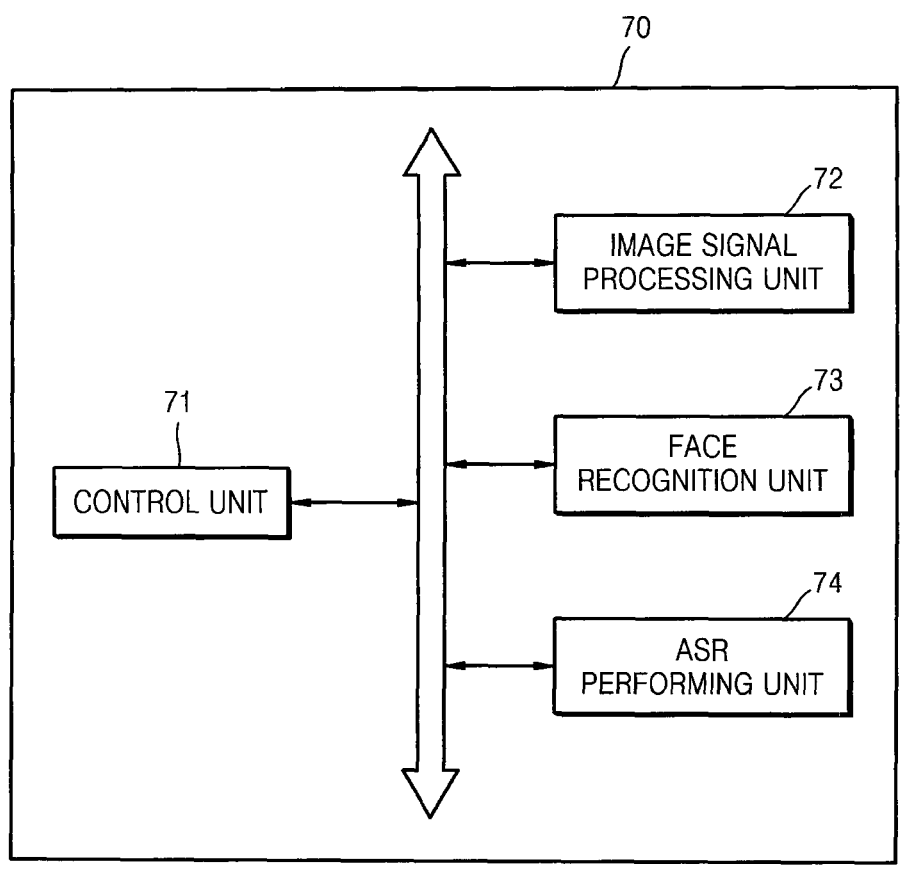
FIG. 2 is an example of a block diagram of the digital signal processing unit of FIG. 1.

FIG. 1 is a block view of an example of a digital image pickup device 100 according to an embodiment of the present invention. FIG. 2 is an example of a block diagram of a digital signal processing unit 70 of FIG. 1. Referring to FIG. 1, the digital image pickup device 100 includes an optical unit 10, an optical drive unit 11, an image pickup device 15, an image pickup device control unit 16, a flash 17, a manipulation unit 20, a program storage unit 30, a buffer storage unit 40, a data storage unit 50, a display control unit 60, a data drive unit 61, a scanning drive unit 63, a display unit 65, and the digital signal processing unit (DSP) 70.

The optical unit 10 receives an optical signal from an object and provides the received optical signal to the image pickup device 15. The optical unit 10 may include at least one lens unit such as a zoom lens controlling a viewing angle to be narrow or wide according to a focal length and a focus lens controlling a focal point of the object. Also, the optical unit 10 may further include an iris for controlling the amount of a light beam.

The optical drive unit 11 controls the position of the lens unit to perform focusing and the opening/closing of the iris to adjust the amount of a light beam. The optical drive unit 11 may control the optical unit 10 according to a control signal automatically generated according to an image signal input in real time or a control signal manually input by a user.

The optical signal passing through the optical unit 10 forms an image of the object on a light receiving surface of the image pickup device 15. A charge coupled device (CCD) or complementary metal oxide semiconductor image sensor (CIS) for converting the optical signal to an electric signal may be used as the image pickup device 15. The sensitivity of the image pickup device 15 may be controlled by the image pickup device control unit 16. The image pickup device control unit 16 may control the image pickup device 15 according to the control signal automatically generated according to an image signal input in real time or the control signal manually input by a user.

In an embodiment, the DSP 70 controls the optical sensitivity, that is, an ISO sensitivity, of the image pickup device 15. When an image of an object to be photographed is determined to contain a sensitive face, the use of a flash is prohibited. When the use of the flash is prohibited and the brightness of the object to be photographed is low, that is, the object exists in a dark environment, the DSP 70 may increase the sensitivity of the ISO so that the optical sensitivity of the image pickup device 15 is high. In embodiments, the ISO sensitivity may be classified into a low sensitivity of ISO 25-50, an intermediate sensitivity of ISO 100-200, a high sensitivity of ISO 200-400, and a very high sensitivity of ISO 800-3200. The ISO sensitivity is not limited to the above classifications and an ISO sensitivity higher than the ISO sensitivity set by the user or a default ISO sensitivity may be set. Thus, even when the sensitive face is photographed in a low brightness state without using a flash, the sensitive face may be photographed by adjusting the ISO setting.

The flash 17 is a light emitting unit for emitting a light beam with an amount of a light beam and at an emission timing set by a control unit 71 (see FIG. 2) of the DSP 70. In embodiments, when the control unit 71 of the DSP 70 determines that a sensitive face exists in an image to be photographed, the use of the flash 17 is prohibited so that the emission of a light beam is prevented.

The manipulation unit 20 may receive external control signals from a user. The manipulation unit 20 may include a shutter-release button for generating a shutter-release signal that indicates that the image pickup device 15 should be exposed to light from an object for a predetermined time period in order to photograph the object, a power button for generating a signal that indicates the power should be turned on or off, and a zoom-in button and a zoom-out button for generating signals that indicate that the viewing angle should be respectively decreased or increased. Additionally, the manipulation unit 20 may include, but is not limited by, a variety of function buttons, for example, button(s) for inputting text, buttons for selecting a photographing mode, button(s) for selecting a reproduction mode, button(s) for selecting a white balance setting, and button(s) for selecting an exposure setting. Moreover, the manipulation unit 20 may include, a keyboard, a touch pad, a touch screen, and/or a remote controller. The digital image pickup device 100 may include a mode where the flash will not be used whether or not an object to be photographed includes a sensitive face or not.

Also, the digital image pickup device 100 may include a program storage unit 30 for storing programs such as an operation system, and an application system for driving the digital image pickup device 100; a buffer storage unit 40 for temporary data storage; and a data storage unit 50 for storing image files including image signals and various information needed for programs.

In addition, the digital image pickup device 100 includes a display control unit 60 for controlling the display of an operation state of the digital image pickup device 100 or for controlling the display of a photographed image. or for controlling information regarding a photographed image. The data drive unit 61 and the scanning drive unit 63 may be configured to transfer display data from the display control unit 60 to the display unit 65. The display unit 65 may display an image based on the signals received from the data drive unit 61 and the scanning drive unit 63. Embodiments of the display unit 65 include, but are not limited by, a liquid crystal display (LCD) panel, an organic light emitting display (OLED) panel, and an electrode position display (EDD) panel.

The digital image pickup device 100 includes the DSP 70 configured to process an input image signal and control the respective constituent elements according or an external input signal. The DSP 70 will be described with reference to FIG. 2.

Referring to FIG. 2, the DSP 70 includes the control unit 71, an image signal processing unit 72, a face recognition unit 73, and an advanced shake reduction (ASR) performing unit 74. The control unit 71 controls the overall operation of the DSP 70. In the present embodiment, whether a face recognized by the face recognition unit 73 is a sensitive face is determined and, if so, the use of the flash 17 is prohibited.

The DSP 70 may be further configured to control the digital image pickup device 100 to perform ASR when the use of the flash 17 is prohibited. The ASR is a function to enable photography without shake in a low luminance environment. Thus, in an environment where the use of the flash 17 is prohibited, the ASR may be used in order to reduce the shake of an image in a low speed shutter environment. A low speed shutter environment may be where the maximum shutter speed is ¼ seconds. The ASR may enable a natural color presentation in the generated image despite the low luminance (or dark) environment without using the flash 17.

Also, when the use of the flash 17 is prohibited, the digital image pickup device 100 may perform photography by increasing the optical sensitivity. In embodiments, if the optical sensitivity is selectively increased, then ASR is performed. When the ISO sensitivity increases, a fast shutter speed may be obtained. Thus, even when the use of a flash is prohibited, the deterioration of image quality may be lessened.

The image signal processing unit 72 converts the image signal output from the image pickup device 15 and performs image signal processes such as gamma correction, color filter array interpolation, color matrix, color correction, and color enhancement. The converted image signal may be more suitable for the eyes of a human. Also, the image signal processing unit 72 may perform auto white balance or perform an auto exposure algorithm. The image signal processing unit 72 may adjust the size of image data using a scalar and compress the image data to form an image file in a predetermined format, or conversely decompress the image file. Images may be obtained based on a shutter-release signal and on based on a real time live view mode prior. The image signal processing unit 72 may perform different image signal processes depending on how the image is obtained.

The face recognition unit 73 recognizes a face of a person from an obtained image. The face recognition unit 73 may be configured to recognize a faces and characteristics of a face in several ways. One way the face recognition unit 73 may recognize a face is using a database (not shown) containing the distances and shapes of the eyes, nose, or mouth of a human to recognize a face. Another way the face recognition unit 73 may be configured to recognize faces and characteristics of faces is using neural networks. Yet another way the face recognition unit 73 may be configured to recognize faces and characteristics of faces is using textual recognition. And yet another way the face recognition unit 73 may be configured to recognize faces and characteristics of faces is using an eigenface algorithm, or an fisherface algorithm, or a Hidden Markov model algorithm. The face recognition unit 73 may recognize the characteristics of a face. For example, the face recognition unit 73 may recognizes whether or not the face is a smiling face and/or whether or not the face is a face with closed or open eye lids. The face may be determine to not be a sensitive face based on the eye lids being closed despite the face otherwise being a sensitive face. Additionally, the face recognition unit 73 may be able to distinguish between a sensitive face and an adult face Additionally, the face recognition unit 73 may be able to determine that the face is the face of an older person, which may be a sensitive face. The face recognition unit 73 may be able to determine whether or not the face is looking toward the digital image pickup device 100.

The ASR performing unit 74 performs ASR in response to control signals from the control unit 71. The ASR function is performed by combining at least two different images. The images are obtained with different settings for obtaining the images. For example, one image may be obtained with settings as for low gain and long exposure and another image may be obtained with setting for reduced exposure time and high gain. The at least two obtained images are synthesized so that an image with less noise and less hand trembling is produced. In an embodiment, the control unit 71 is configured to control the operation of the ASR performing unit 74 to perform ASR when the use of the flash 17 is prohibited and the optical sensitivity is increased.

Figure 3:
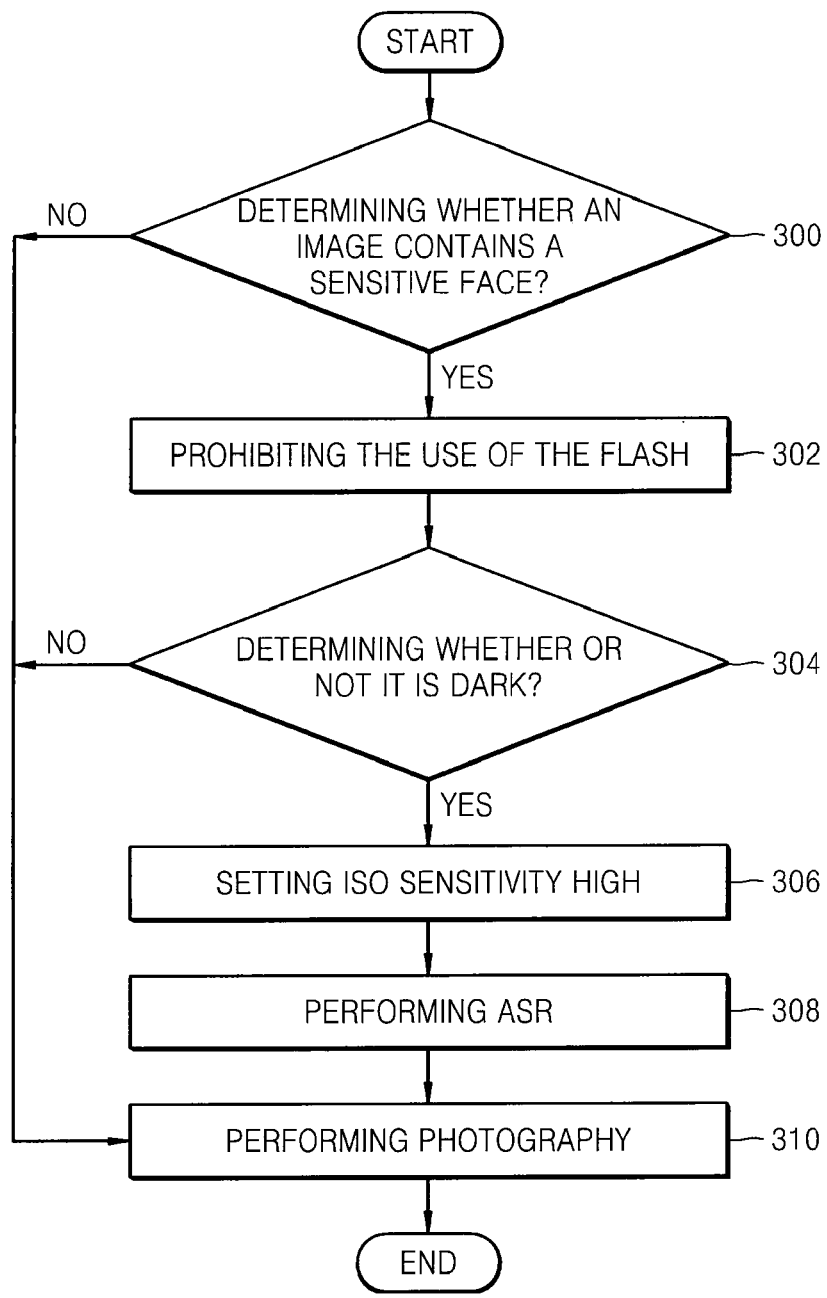
FIG. 3 is a flowchart of an example of a photography control method for prohibiting the use of a flash according to an embodiment of the present invention.

FIG. 3 is a flowchart of an example of a photography control method for prohibiting the use of a flash according to an embodiment of the present invention. Referring to FIG. 3, the method begins with determining whether an image contains a sensitive face (Operation 300.) Using the methods described above, an image may be analyzed to determine whether or not it contains a sensitive face. For example, features may be extracted from the image and compared with information stored in a database to determine whether or not the image contains a face and/or a sensitive face. If it is determined that no sensitive face is in the image, then method continues to performing photography (Operation 310.) If a sensitive face is found in the image, then the method continues with prohibiting the use of the flash (Operation 302.) The use of a flash is prohibited. As described above the control unit may prohibit the use of the flash. The method continues with determining whether or not it is dark (Operation 304.). Whether the photography environment is dark, that is, whether or not the illuminance of an object is low, may be determined through an auto exposure (AE) module. If is determined that the photography environment is not dark then the method continues to performing photography (Operation 310.) When the photography environment is determined to be dark the method continues with setting ISO sensitivity high (Operation 306.) The method optionally continues with performing ASR (Operation 308.) As described above, two or more images may be synthesized to improve the image quality. The method continues to performing photography (Operation 310.) If there was a sensitive face in the image, then the sensitive face is photographed with the increased optical sensitivity of the image pickup device. Thus, a user may perform photography without substantially deteriorating an image quality in a low brightness environment generated by not using a flash and the user may safely photograph a subject with a sensitive face without potentially hurting the eyes of the subject.

Figure 4:
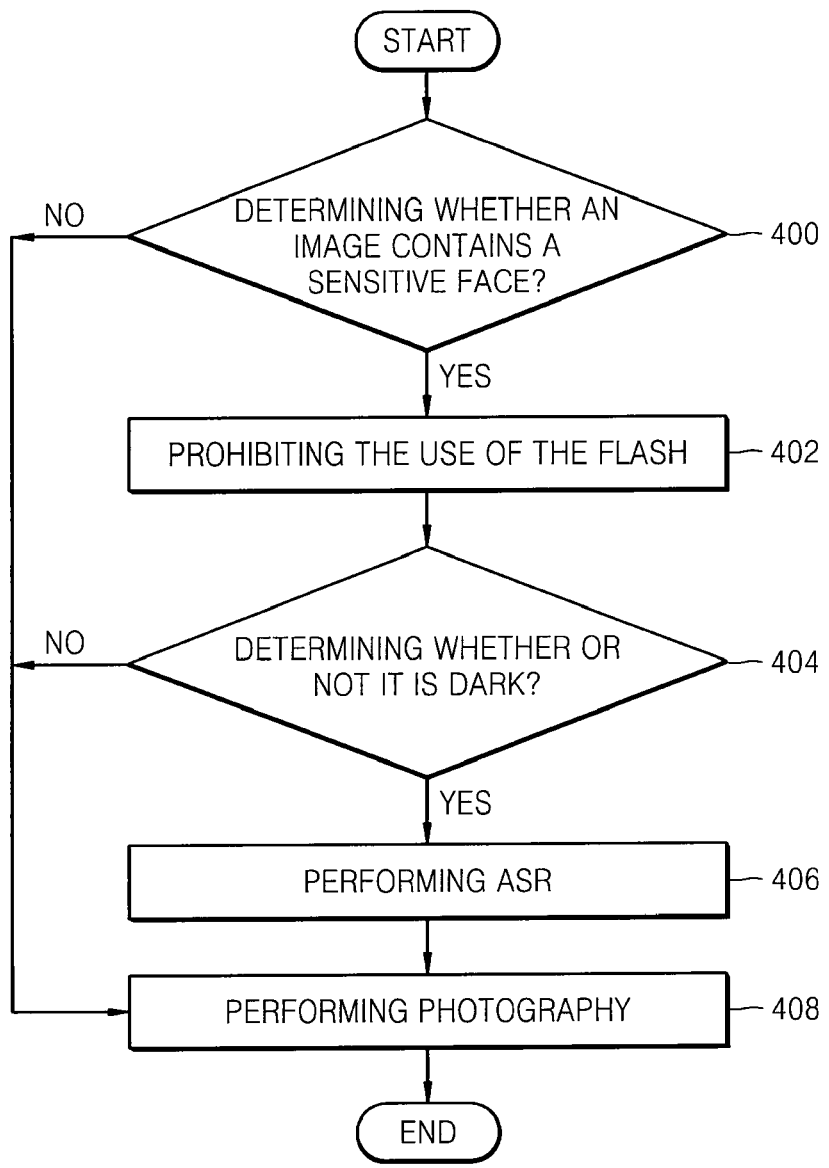
FIG. 4 is a flowchart of an example of a photography control method for prohibiting the use of a flash according to another embodiment of the present invention.

FIG. 4 is a flowchart of an example of a photography control method for prohibiting the use of a flash according to an embodiment of the present invention. Referring to FIG. 4, the method being with determining whether an image contains a sensitive face (Operation 400.) Using the methods described above, an image may be analyzed to determine whether or not it contains a sensitive face. For example, features may be extracted from the image and compared with information stored in a database to determine whether or not the image contains a face and/or a sensitive face. If is determined that no sensitive face is in the image, then method continues to performing photography (Operation 408.) If a sensitive face is found in the image, then the method continues with prohibiting the use of the flash (Operation 402.) The use of a flash is prohibited. As described above the control unit may prohibit the use of the flash. The method continues with determining whether or not it is dark (Operation 304.). Whether the photography environment is dark, that is, whether or not the illuminance of an object is low, may be determined through an auto exposure (AE) module. If is determined that the photography environment is not dark then the method continues to performing photography (Operation 408.) When the photography environment is determined to be dark the method continues with performing ASR (Operation 406.) As described above, two or more images may be synthesized to improve the image quality. The method continues to performing photography (Operation 408.) If there was a sensitive face in the image, then the sensitive face is photographed with the increased optical sensitivity of the image pickup device. Thus, a user may perform photography without substantially deteriorating an image quality in a low brightness environment generated by not using a flash and the user may safely photograph a subject with a sensitive face without potentially hurting the eyes of the subject.

The invention can also be embodied on a computer readable medium with computer instructions that may be executed by a computer. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

The various illustrative logic, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A photography control method for controlling use of a flash, the method comprising:
   determining, using a processor, whether an image contains a sensitive face; and
   when the image contains the sensitive face:
      prohibiting the use of the flash;
      increasing an optical sensitivity for photographing while the flash is prohibited;
      capturing at least two images including the sensitive face while the flash is prohibited and the optical sensitivity is increased; and
      combining the at least two images to form a composite image to compensate for the increased optical sensitivity and the prohibiting the use of the flash.

2. The photography control method of claim 1, wherein determining whether the image contains the sensitive face comprises:
   recognizing a face in the image; and
   determining that the image contains the sensitive face when the recognized face is determined to be a face of a baby.

3. The photography control method of claim 1, further comprising performing shake reduction while the at least two images are captured.

4. The photography control method of claim 1, wherein, in the capturing, the at least two images are obtained with different settings for obtaining the at least two images.

5. A computer program product comprising a non-transitory computer-readable medium storing:
   a first set of codes for causing a computer to determine whether an image contains a sensitive face; and
   a second set of codes for causing the computer to, when the image contains the sensitive face, at least:
      prohibit the use of a flash;
      increase an optical sensitivity for photographing while the flash is prohibited;
      capture at least two images of the sensitive face while the flash is prohibited and the optical sensitivity is increased; and
      combine the at least two images to form a composite image to compensate for the increased optical sensitivity and the prohibiting the use of the flash.

6. A photography control apparatus for prohibiting the use of a flash, the apparatus comprising:
   a face recognition unit configured to recognize a face from an obtained image; and
   a control unit configured to, when the recognized face is a sensitive face:
      prohibit the use of the flash;
      increase an optical sensitivity for photographing while the flash is prohibited;
      capture at least two images of the recognized face while the flash is prohibited and the optical sensitivity is increased; and
      combine the at least two images to form a composite image to compensate for the increased optical sensitivity and the prohibiting the use of the flash.

7. A photography control method for controlling use of a flash, the method comprising:
   determining, using a processor, whether an image contains a sensitive face; and
   when the image contains the sensitive face:
      prohibiting the use of the flash;
      increasing an optical sensitivity for photographing while the flash is prohibited;
      capturing at least two images including the sensitive face while the flash is prohibited and the optical sensitivity is increased; and
      combining the at least two images to form a composite image to compensate for the increased optical sensitivity and the prohibiting the use of the flash,
      wherein, in the capturing, one image of the at least two images is obtained with settings as for low gain and long exposure and another image of the at least two images is obtained with setting for reduced exposure time and high gain.

* * * * *